United States Patent
Bhatoolaul et al.

(10) Patent No.: US 12,432,646 B2
(45) Date of Patent: Sep. 30, 2025

(54) PHYSICAL BROADCAST CHANNEL (PBCH) EXTENSION TO MANAGE EXTENDED MASTER INFORMATION BLOCK (MIB)

(71) Applicant: NOKIA TECHNOLOGIES OY, Espoo (FI)

(72) Inventors: David Bhatoolaul, Swindon (GB); Nitin Mangalvedhe, Hoffman Estates, IL (US); Rapeepat Ratasuk, Inverness, IL (US); Michel Robert, Vanves (FR); Srinivasan Selvaganapathy, Bangalore (IN)

(73) Assignee: NOKIA TECHNOLOGIES OY, Espoo (FI)

(*) Notice: Subject to any disclaimer, the term of this patent is extended or adjusted under 35 U.S.C. 154(b) by 379 days.

(21) Appl. No.: 18/031,369

(22) PCT Filed: Sep. 21, 2021

(86) PCT No.: PCT/EP2021/075851
§ 371 (c)(1),
(2) Date: Apr. 12, 2023

(87) PCT Pub. No.: WO2022/078719
PCT Pub. Date: Apr. 21, 2022

(65) Prior Publication Data
US 2023/0379802 A1     Nov. 23, 2023

(30) Foreign Application Priority Data
Oct. 16, 2020     (IN) .............................. 202041045076

(51) Int. Cl.
*H04W 48/12*     (2009.01)

(52) U.S. Cl.
CPC .................................. *H04W 48/12* (2013.01)

(58) Field of Classification Search
None
See application file for complete search history.

(56) References Cited

U.S. PATENT DOCUMENTS

2015/0358985 A1* 12/2015 Chen ..................... H04W 72/20
                                                                370/328
2019/0313428 A1  10/2019 Zhou et al.
2022/0394671 A1* 12/2022 Zhang .................. H04B 7/0617

FOREIGN PATENT DOCUMENTS

WO     2020/190205 A1     9/2020

OTHER PUBLICATIONS

International Search Report and Written Opinion dated Jan. 4, 2022 corresponding to International Patent Application No. PCT/EP2021/075851.

(Continued)

*Primary Examiner* — Hong S Cho
(74) *Attorney, Agent, or Firm* — Carter, DeLuca & Farrell LLP

(57) ABSTRACT

Systems, methods, apparatuses, and computer program products for physical broadcast channel (PBCH) extension to manage extended master information block (MIB) are provided. A user equipment (UE) may determine whether an MIB extension exists. If the MIB extension exists, then the UE may determine an extended PBCH time-frequency location.

20 Claims, 5 Drawing Sheets

(56) References Cited

OTHER PUBLICATIONS

3GPP TS 38.300 V16.3.0 (Sep. 2020), Technical Specification, 3rd Generation Partnership Project; Technical Specification Group Radio Access Network; NR; NR and NG-RAN Overall Description; Stage 2 (Release 16), Oct. 2, 2020, pp. 1-148, XP051961311.
3GPP TS 38.331 V16.2.0 (Sep. 2020), Technical Specification, 3rd Generation Partnership Project; Technical Specification Group Radio Access Network; NR; Radio Resource Control (RRC) protocol specification (Release 16), Oct. 7, 2020, pp. 1-921, XP051961610.
Vivo, "Remaining aspects on NR-PBCH," 3GPP Draft; R1-1800173, 3GPP TSG RAN WG1 Meeting AH 1801, Vancouver, Canada, Jan. 13, 2018, XP051384663.
Nokia et al., "Initial access for REDCAP UEs," 3GPP Draft; R1-20008072, 3GPP TSG-RAN WG1 Meeting #103-e, e-Meeting, Oct. 16, 2020, XP051939452.
3GPP TS 38.212 V16.3.0 (Sep. 2020), Technical Specification, 3rd Generation Partnership Project; NR; Multiplexing and channel coding (Release 16), Sep. 2020.
Ericsson, "Revised SID on Study on Support of reduced capability NR devices," RP-201386, 3GPP TSG RAN Meeting #88e, Electronic Meeting, Jun. 29-Jul. 3, 2020.

\* cited by examiner

PHYSICAL BROADCAST CHANNEL (PBCH) EXTENSION TO MANAGE EXTENDED MASTER INFORMATION BLOCK (MIB)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for physical broadcast channel (PBCH) extension to manage extended master information block (MIB).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include receiving, by a user equipment, a master information block on physical broadcast channel. The method may include determining whether a master information block extension is indicated based on at least one of: blind detection, a spare bit in the master information block, or a physical signal associated with a synchronization signal block. The method may include determining, based on the master information block extension being indicated, a physical broadcast channel extension time-frequency location within the physical broadcast channel based on: a fixed time-frequency location, or at least one of the synchronization signal block position or control resource set information.

In a variant, symbols of the physical broadcast channel extension may be multiplexed within a synchronization signal burst set. In a variant, symbols of the physical broadcast channel extension may be multiplexed outside of a synchronization signal burst set. In a variant, the synchronization signal block position may be a punctured synchronization signal burst set position. In a variant, the method may further include monitoring for the punctured synchronization signal burst set position for the physical broadcast channel extension time-frequency location. In a variant, an information element within a system information block 1 may indicate the physical broadcast channel extension time-frequency location and a format of the physical broadcast channel.

In a variant, determining the physical broadcast channel extension time-frequency location may include determining the physical broadcast channel extension time-frequency location from a system information block 1 associated with the control resource set information and a search space location provided by the system information block 1 downlink control information. In a variant, a predefined mapping of the downlink control information may define the control resource set, or the search space location may define the physical broadcast channel extension time-frequency location and a format of the physical broadcast channel extension. In a variant, one or more spare bits within the system information block scheduling the downlink control information may define the physical broadcast channel extension time-frequency location and a format of physical broadcast channel extension.

A second embodiment may be directed to an apparatus including at least one processor and at least one memory comprising computer program code. The at least one memory and computer program code may be configured, with the at least one processor, to cause the apparatus at least to perform the method according to the first embodiment, or any of the variants discussed above.

A third embodiment may be directed to an apparatus that may include circuitry configured to perform the method according to the first embodiment, or any of the variants discussed above.

A fourth embodiment may be directed to an apparatus that may include means for performing the method according to the first embodiment, or any of the variants discussed above. Examples of the means may include one or more processors, memory, and/or computer program codes for causing the performance of the operation.

A fifth embodiment may be directed to a computer readable medium comprising program instructions stored thereon for performing at least the method according to the first embodiment, or any of the variants discussed above.

A sixth embodiment may be directed to a computer program product encoding instructions for performing at least the method according to the first embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
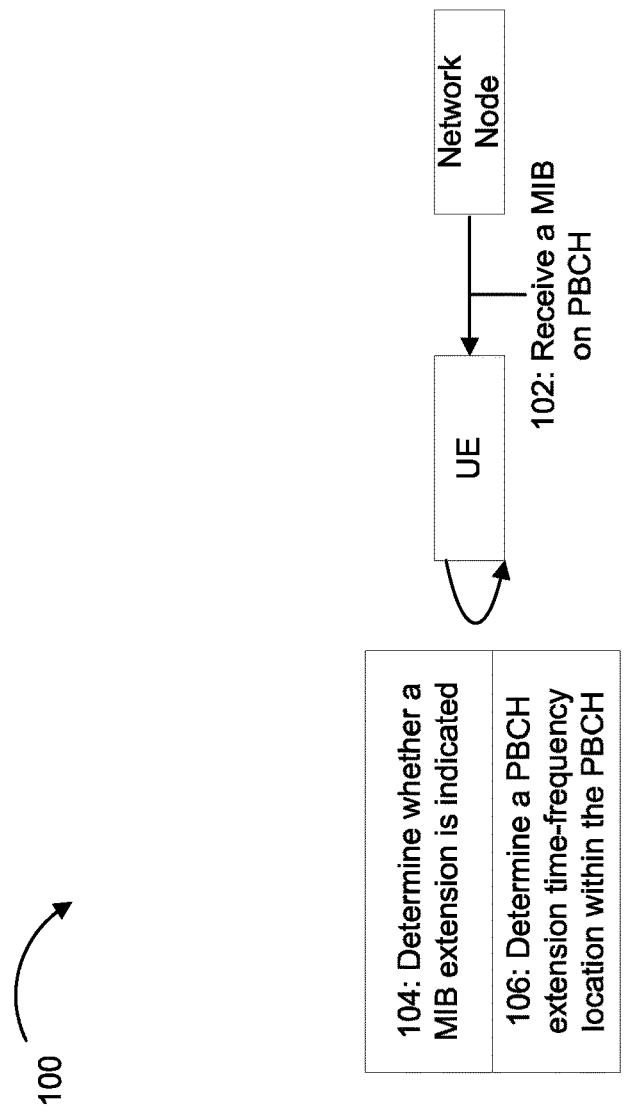
FIG. 1 illustrates an example of PBCH extension to manage extended MIB, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for PBCH extension to manage extended MIB is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Aspects of NR may relate to reduced capability (RED-CAP) devices, sometimes referred to as NR-light devices. REDCAP devices may have to meet certain operating parameters. For example, for device complexity, new device types may have to be designed to lower the device cost and complexity as compared to high-end eMBB and URLLC devices. This may be particularly relevant for industrial sensors. In addition, for device size, device design may have to comply with compact form factor. Further, for deployment scenarios, devices may have to support frequency range 1 (FR1) and/or frequency range 2 (FR2) bands for frequency division duplexing (FDD) and time division duplexing (TDD).

Some aspects of device design may contribute to UE complexity reduction. For example, these aspects may include a reduced number of reception (RX) and/or transmission (TX) antennas, device bandwidth reduction, half-duplex-FDD, relaxed device processing time, and/or relaxed device processing capability. Some of the previously-mentioned techniques (e.g., reduced number of antennas and bandwidth reduction) may reduce cell coverage for RED-CAP devices. As a result, there is a need for functionality that may mitigate or reduce the performance degradation of such complexity reduction. For example, such functionality may include coverage recovery to compensate for potential coverage reduction due to the device complexity reduction. Additionally, there may be impacts on network capacity and spectral efficiency.

REDCAP devices may have to have separate control resource set (CORESET) and system information block (SIB) transmissions (e.g., separate CORESET0 and system information block 1 (SIB1) transmissions). The separate transmissions may be used for coverage compensation. For example, a REDCAP device with one RX antenna may have degraded downlink (DL) performance by approximately 5 decibels (dB). Based on this, the legacy CORESET0 may not be sufficient and a new CORESET0 with additional repetition may need to be supported. Therefore, a new CORESET0 and/or search space for REDCAP device SIB1 may need to be defined. For machine type communication (MTC), a mix of preconfigured rules and, e.g., 4 spare bits in the legacy MIB may be used to indicate to MTC devices where and when the MTC-specific SIB1 may appear. This approach may not be directly adopted for supporting RED-CAP devices, however, since there may be just a single guaranteed spare bit in the NR MIB for the various configurations.

Several methods of specifying a new CORESET0/search space for the REDCAP SIB1 could be used. However, the option of using the NR PBCH to signal resourcing and/or scheduling information for a new REDCAP SIB1, may be restricted by there being a limited number of spare MIB bits (in some cases, just one spare bit in certain NR configurations). The problem that results is how the NR PBCH can be extended to support MIB extension in order to maintain backwards compatibility, provide enough spare bits to convey new information for use by REDCAP devices, and/or provide additional spare bits for other features.

Some embodiments described herein may provide PBCH extension to manage extended MIB. In certain embodiments, the UE may determine whether an MIB extension exists (e.g., is indicated in the MIB). For example, the UE may perform this determination based on a MIB spare bit and/or based on a signal. If the MIB extension exists, then the UE may determine an extended PBCH time-frequency location. In certain embodiments, the extended PBCH time-frequency location may be predefined or fixed. For example, the additional PBCH symbols may be multiplexed within a 5 ms SS burst set. As another example, the additional PBCH symbols may be multiplexed outside the 5 ms SS burst set.

In other embodiments, the extended PBCH time-frequency location may be determined, for example, from the SIB 1 message. Continuing with the previous example, after an initial reading of the SIB 1 message, the UE may determine the extended PBCH location and format. Thereafter, the UE may assume these characteristics to be a fixed property for the cell. Still continuing with the previous example, the determination may be an implicit determination, where the extended PBCH may use SSB positions that are blank for use by the current SSB (e.g., an information element (IE) can be used to perform this implicit determination). Alternatively, the determination may be an explicit determination, where the extended PBCH location and format may be explicitly defined used an IE within the SIB1 message.

As another example of determining the extended PBCH time-frequency location from SSB positions and/or CORE-SET information, the UE may determine the extended PBCH time-frequency location using a time-frequency location and format from an MIB. Continuing with the previous example, after an initial reading of the MIB, the UE may determine the extended PBCH location and format. Thereafter, the UE may assume these characteristics to be a fixed property for the cell. Still continuing with the previous example, the determining may be an implicit determination, where a predefined mapping of the MIB bits used to define the CORESET0 and/or search space 0 may define the location and format of the extended PBCH. Alternatively, the determination may be an explicit determination, where spare bits within the SIB1 scheduling downlink control information (DCI) may be used to define the location and format of the extended PBCH.

FIG. 1 illustrates an example 100 of PBCH extension to manage extended MIB, according to some embodiments. The example 100 includes a network node (e.g., a gNB) and a UE. As illustrated at 102, the network node may transmit, and the UE may receive, a MIB on PBCH. For example, the UE may receive the MIB upon entering a cell associated with the network node. As illustrated at 104, the UE may determine whether a MIB extension is indicated. For example, the UE may determine a presence of a PBCH extension. The UE may determine the presence of the MIB extension based on blind detection, based on one or more spare bits in the MIB indicating the presence of the PBCH extension, or using a physical signal (e.g., a tertiary synchronisation signal (TSS) or wake-up signal (WUS)-type signal, in a fixed position relative to the SSB). The physical signal may be scrambled using a set of different sequences (e.g., 4 sequences) to convey information about the subsequent PBCH extension (e.g., 4 configuration options, such as location, modulation and coding signal (MCS), size, and/or the like). In this case, the UE may have to perform a blind detection to determine the presence of this signal (using the set of scrambling sequences). In addition, the signal may have a fixed position (e.g., relative to the SSB), which may allow the UE to quickly find and decode the signal.

Figure 2:
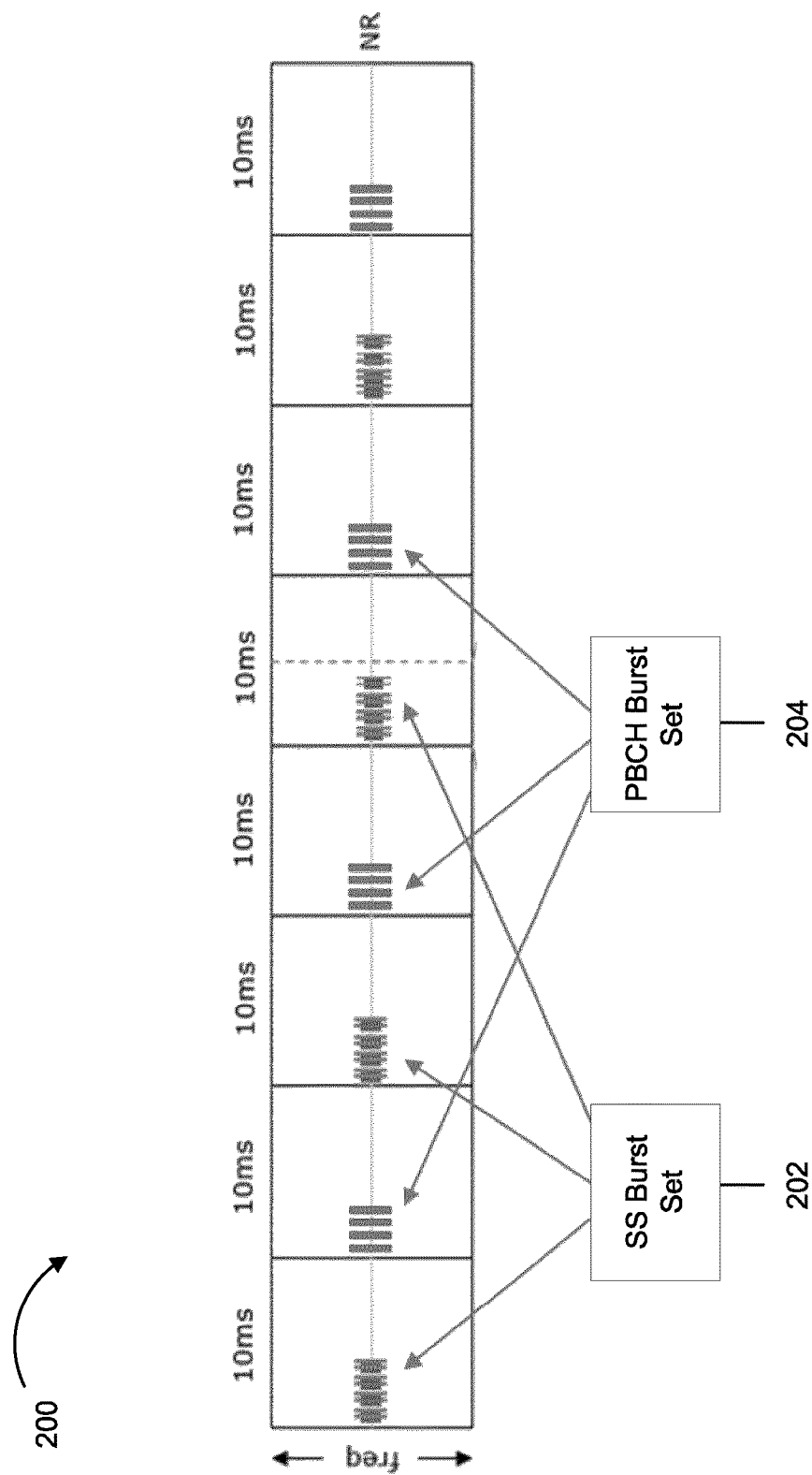
FIG. 2 illustrates an example of time multiplexing outside a 5 millisecond (ms) synchronization signal (SS) burst set period, according to some embodiments.

As illustrated at 106, the UE may determine a PBCH extension time-frequency location within the PBCH. For example, the UE may determine the location of the PBCH extension using one or more schemes for locating where the additional resources for the extended PBCH. The one or more schemes may include a fixed scheme, which may provide for a simpler implementation. A first fixed scheme may include time multiplexed outside a 5 ms SS burst set. An example of this scheme is illustrated in FIG. 2, described elsewhere herein. This scheme may include a PBCH that is, e.g., 2-4 symbols wide with integrated reference signal (RS) and bandwidth not exceeding an original SSB. The PBCH may be transmitted at a fixed timed offset (e.g., 5 or 10 ms) from the original SSB blocks and at the same frequency resource block (RB) offset as the SSB.

In this scheme, SSB periodicity may have to be 10 ms or higher, in certain embodiments. Depending on the extended PBCH payload size, the PBCH extension may match the SSB repetitions and timing with a fixed timing offset. This may help to ensure an equivalent coverage performance as the original SSB if a similar code-rate is implemented. Alternatively, in certain embodiments, a similar code rate can also be achieved with a different payload size through adjusting the bandwidth and/or number of transmitted symbols used for transmitting the PBCH extension.

The additional PBCH symbols provided in this scheme may be transmitted with a RS, and no SSB associated synchronization signal, which may conserve network resources (e.g., bandwidth) and may avoid confusing legacy UEs. The additional PBCH symbols may be transmitted with a RS and an additional synchronization signal (e.g., in place of secondary synchronization signal (SSS)), that may be distinct from the synchronization signal used for SSB (e.g., using a different scrambling sequence). In this way, certain embodiments may enable a UE to efficiently detect the presence of PBCH extension bits or indicate support for REDCAP UEs. In case of standalone NR deployments, the additional PBCH symbols may be placed in the first or second orthogonal frequency division multiplexing (OFDM) symbols of a subframe.

With respect to REDCAP UE detection of cell support for the fixed scheme that includes time multiplexing outside the 5 ms SS burst set, after obtaining synchronization based on the existing SSB bursts and also detecting that the SSB burst periodicity is equal to or more than 10 ms, the UE may attempt to detect PBCH symbols at the additional location based on demodulation reference signal (DMRS) symbols at this location and/or a sequence transmitted in the place of SSS within/around the extended PBCH symbols.

In this way, this scheme may, given available symbols, be used for coverage extension. This may improve operations of a cell.

Figure 3:
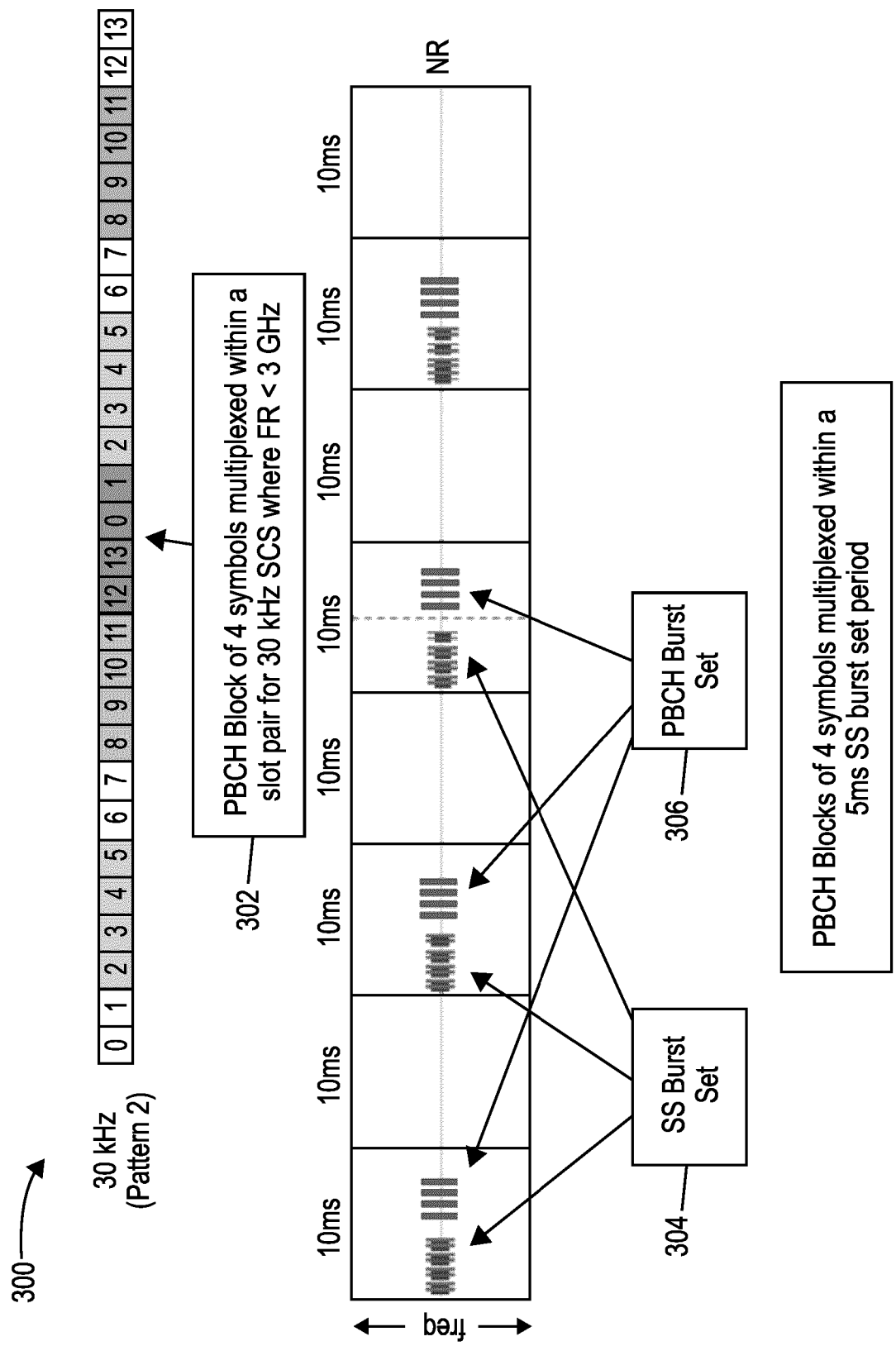
FIG. 3 illustrates an example of time multiplexing within a 5 ms SS burst set period, according to some embodiments.

Another fixed scheme may include time multiplexing within the 5 ms SS burst set period (either per SSB, per slot, per slot pair, or within the 5 ms SS burst set period). An example of this scheme is illustrated in FIG. 3, described elsewhere herein. In this scheme, per slot, or pair of slots, where the SSBs may be located, some symbols may be used to support the extended PBCH. In certain embodiments, not all symbols might be used in order to maintain flexibility provided by these symbols. For example, the unused symbols may allow for transmission of downlink control signaling in the beginning of the slot, may support transmissions of SSB and data channels with different numerologies in the middle of the slot, and/or may allow for reception of some UL transmissions in the end of the slot.

Certain embodiments of this scheme may include one or more variations of time multiplexing within the 5 ms SS burst set period (e.g., depending on the subcarrier spacing (SCS)-frequency range (FR)-SSB configuration). On a per SSB basis, some SCS-FR configurations may have at least 1 symbol spare either after or before the SSB. In this case, this may allow the UE to read the SSB and the extended PBCH in the same sweep of the beams present, if multiple beams are used. On a per slot or slot pair basis, the SS blocks may be configured in pairs. In this case, the extended PBCH pairs may be similarly transmitted consecutively in pairs. Within the 5 ms SS burst set period, there may be a number of slots within the 5 ms period unused, depending on the SCS-FR.

Each SCS-FR permutation may have to have a unique subset of unused symbols to be repurposed to support the extended PBCH. Given the number of available unused symbols, and the desire to maintain similar coverage, the extended PBCH may support a reduced number of information bits for PBCH and/or may have to have more repetitions.

In this way, the fixed scheme that includes time multiplexing within the 5 ms SS burst set period may be more power efficient for the UE compared to the fixed scheme that includes time multiplexing outside of the 5 ms SS burst set period described above. In addition, the fixed scheme that includes time multiplexing within the 5 ms SS burst set period may be widely applicable to various SSB periodicity options and may provide for close packing of additional symbols (which may enable the UE to be more power efficient).

Rather than including a fixed scheme described above, certain embodiments may include a configurable scheme. As a first example configurable scheme, the PBCH may be broadcast in SSB positions within an SS burst set that have been punctured. NR may already support configuration options and signalling (e.g., ssb-PositionsInBurst parameter in SIB1) to indicate which current SSB positions within an SS burst set are transmitted. In this context, and as a first example embodiment, enhanced REDCAP UEs may be set to monitor unused SSB positions for the extended PBCH. Continuing with the previous example embodiment, the enhanced UE device may have to know the position of punctured SSBs. Because of this, the UE may be expected to fully acquire the PBCH in order to read an SIB1. As an alternative to knowing the position of punctured SSBs, the enhanced UE may blindly attempt to locate the extended PBCH symbols. As an alternative, the extended PBCH symbols may be broadcast in such a way, that they minimize degradation to UE performance. As a second example embodiment, an information element (IE) may be defined within SIB1 to explicitly indicate the location and format of the extended PBCH. After reading the IE, the REDCAP UE can assume this to be a cell property.

In this way, with respect to broadcasting PBCH in SSB positions, performance (coverage/payload) of the extended PBCH may be sensitive to the number of unused SSB positions available. In addition, this scheme may provide for simple and flexible implementation.

As a second example configurable scheme, location of PBCH extensions bits may be determined from the SIB1 CORESET and search space location given by the MIB. As a first alternative for this second example configurable scheme, a predefined mapping of the existing MIB bits used to define the CORESET0 and/or Search Space 0 may define the location and format of the extended PBCH. In certain embodiments, PBCH extension symbols may be predefined to be located adjacent to the CORESET0 symbols. Alternatively, the PBCH extension symbols may be predefined to be located within the defined CORESET0 but in symbols/slots not used by the search space defined for the SIB1. The UE may, from the SSB, SCS, and/or MIB contents and knowledge of the carrier, determine various characteristics (e.g., number of RBs, number of symbols, and/or offset RBs) and location of CORESET0 using the 4 MSB of the MIB pdcch-ConfigSIB1 IE.

Table 1 below defines extension position and format of extension bits, according to some embodiments. From the example table below, defining the set of resource blocks for CORESET0 given certain conditions, for each index (corresponding to the 4 MSB of the MIB pdcch-ConfigSIB1 IE) a column could be defined indicating the number of symbols for the PBCH extension. Effectively, for each permutation of the 4 MSB of the pdcch-ConfigSIB1 IE, non-REDCAP UEs may use the values in Table 1 for an associated definition of the characteristics of the extended PBCH for REDCAP UEs. Certain embodiments can be extended to use, e.g., 4 least significant bits (LSBs) to provide wider variety of options.

TABLE 1

| Index | PBCH Extension Number of Symbols | PBCH Extension Aggregation Level | PBCH Extension Multiplexing Pattern (e.g., adjacent/below) | Comment |
|---|---|---|---|---|
| 0 | 2 | 1 | 1 | |
| 1 | 4 | 2 | 1 | Boost Coverage |
| 2 | 2 | 1 | 2 | Alternative Location |
| 3 | 2 | 1 | 1 | |
| 4 | 4 | 2 | 1 | |
| 5 | 2 | 1 | 2 | |
| 6 | 1 | 1 | | |
| 7 | 2 | 2 | | |

TABLE 1-continued

| Index | PBCH Extension Number of Symbols | PBCH Extension Aggregation Level | PBCH Extension Multiplexing Pattern (e.g., adjacent/below) | Comment |
|---|---|---|---|---|
| 8 | 1 | | | |
| 9 | | | | |
| 10 | | | | |
| 11 | | | | |
| 12 | | | | |
| 13 | | | | |
| 14 | | | | |
| 15 | | | | |

As a second alternative for the second example configurable scheme, spare bits within the SIB1 scheduling DCI may be used to define the location and format of the extended PBCH. After reading the spare bits, the REDCAP UE may then assume the extended PBCH to be a cell property.

In this way, the second example configurable scheme may be simple to implement. Additionally, or alternatively, the second example configurable scheme may provide for flexible implementation.

The schemes for locating the PBCH extension described herein are time-multiplexed schemes because these types of schemes may result in less complex enhancements to UEs and may avoid increasing the bandwidth demands for a cell (which may already have limited bandwidth). However, the example embodiments described herein are not limited to time-multiplexed schemes. In addition, for the schemes described herein, the UE may be a REDCAP UE that use SSBs for time/frequency synchronization, system frame number (SFN) acquisition and, when applicable, related measurements performed by the UE, including beam-related measurements.

After determining the PBCH extension time-frequency location at 106, the UE may locate a scheduling DCI to a physical downlink shared channel (PDSCH). For example, the UE may be a REDCAP UE, and the UE may locate a scheduling DCI to a PDSCH carrying REDCAP-specific SIB1. Continuing with the previous example, a separate CORESET and/or search space may be defined by one or more bits in the extended MIB, and the UE may perform the previously described locating based on the one or more bits. In addition to comprising scheduling information, for a separate REDCAP SIB1, the one or more bits may be used for barring information for one or more types of REDCAP UEs.

As described above, FIG. 1 is provided as an example. Other examples are possible, according to some embodiments. For example, other embodiments may include a spare bit within the MIB extension to indicate additional extension.

FIG. 2 illustrates an example 200 of time multiplexing outside a 5 ms SS burst set period, according to some embodiments. As illustrated in FIG. 2, an SS burst set is illustrated at 202. As further illustrated in FIG. 2, a PBCH burst set is illustrated at 204. The embodiments illustrated in FIG. 2 of time multiplexing outside of a 5 ms SS burst set period are described above in connection with FIG. 1. As indicated above, FIG. 2 is provided as an example. Other examples are possible, according to some embodiments.

FIG. 3 illustrates an example 300 of time multiplexing within a 5 ms SS burst set period, according to some embodiments. As illustrated in FIG. 3, the top illustration, at 302, is of a PBCH of 4 symbols multiplexed within a slot pair for 30 kilohertz (kHz) SCS where FR is less than 3 gigahertz (GHz). As further illustrated in FIG. 3, the bottom illustration illustrates a SS burst set, at 304, and a PBCH burst set at 306. The embodiments illustrated in FIG. 3 of time multiplexing within of a 5 ms SS burst set period are described above in connection with FIG. 1. As described above, FIG. 3 is provided as an example. Other examples are possible, according to some embodiments.

Figure 4:
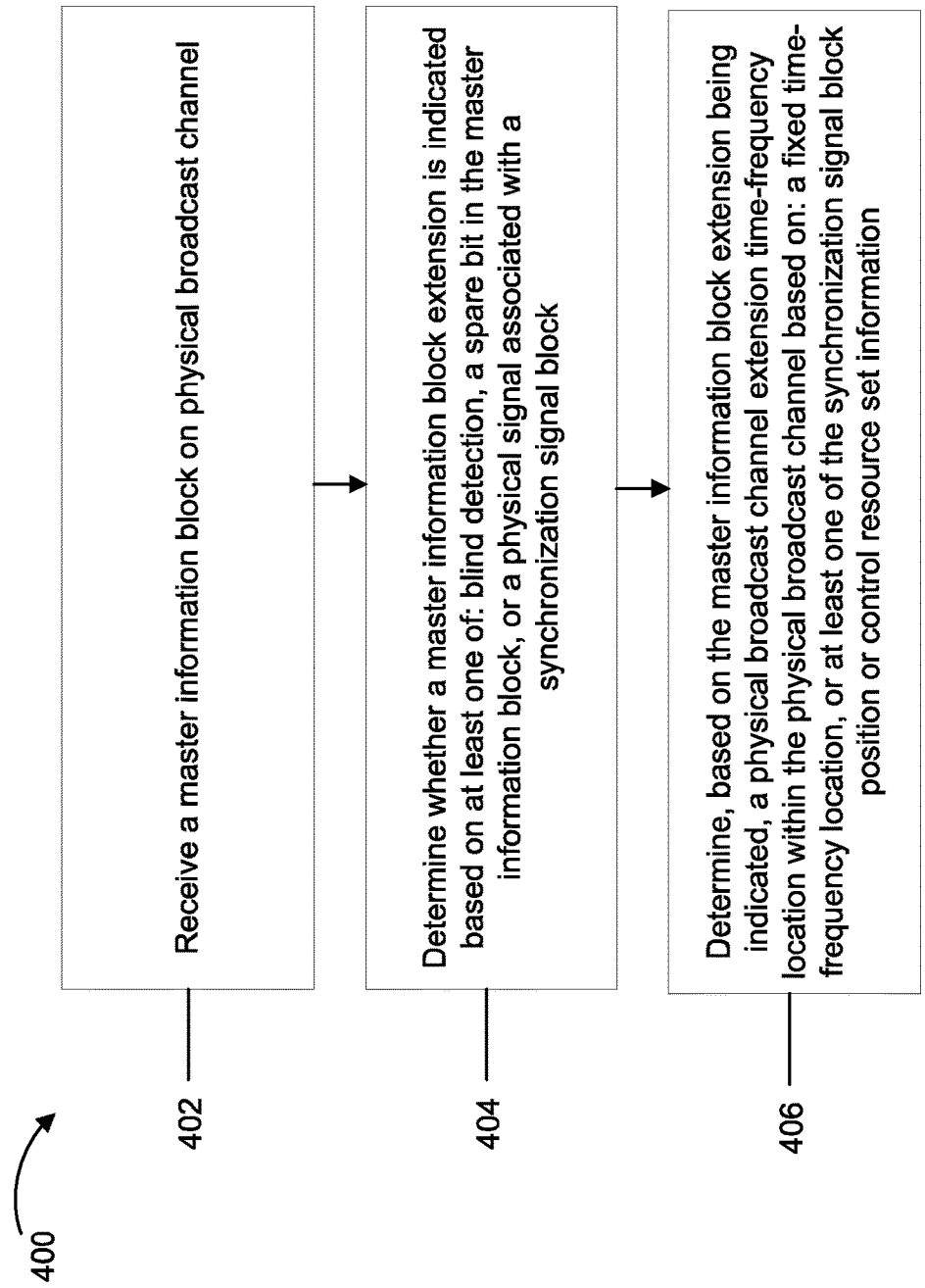
FIG. 4 illustrates an example flow diagram of a method, according to some embodiments.

FIG. 4 illustrates an example flow diagram of a method 400, according to some embodiments. For example, FIG. 4 shows example operations of a UE (e.g., apparatus 20 illustrated in, and described with respect to, FIG. 5b). Some of the operations illustrated in FIG. 4 may be similar to some operations shown in, and described with respect to, FIGS. 1-3.

In an embodiment, the method may include, at 402, receiving a master information block on physical broadcast channel In an embodiment, the method may include, at 404, determining whether a master information block extension is indicated based on at least one of: blind detection, a spare bit in the master information block, or a physical signal associated with a synchronization signal block. In an embodiment, the method may include, at 406, determining, based on the master information block extension being indicated, a physical broadcast channel extension time-frequency location within the physical broadcast channel based on: a fixed time-frequency location, or at least one of a synchronization signal block position or control resource set information.

The method illustrated in FIG. 4 may include one or more additional aspects described below or elsewhere herein. In some embodiments, symbols of the physical broadcast channel extension may be multiplexed within a synchronization signal burst set. In some embodiments, symbols of the physical broadcast channel extension may be multiplexed outside of a synchronization signal burst set. In some embodiments, the synchronization signal block position may be a punctured synchronization signal burst set position. In some embodiments, the method may further include monitoring for the punctured synchronization signal burst set position for the physical broadcast channel extension time-frequency location. In some embodiments, an information element within a system information block 1 indicates the physical broadcast channel extension time-frequency location and a format of the physical broadcast channel.

In some embodiments, the determining at 406 may include determining the physical broadcast channel extension time-frequency location from a system information block 1 associated with the control resource set information and a search space location provided by the system information block 1 downlink control information. In some embodiments, a predefined mapping of the downlink control information may define the control resource set, or the search space location may define the physical broadcast channel extension time-frequency location and a format of the physical broadcast channel extension. In some embodiments, one or more spare bits within the system information block scheduling the downlink control information may define the physical broadcast channel extension time-frequency location and a format of physical broadcast channel extension.

As described above, FIG. 4 is provided as an example. Other examples are possible according to some embodiments.

Figure 5B:
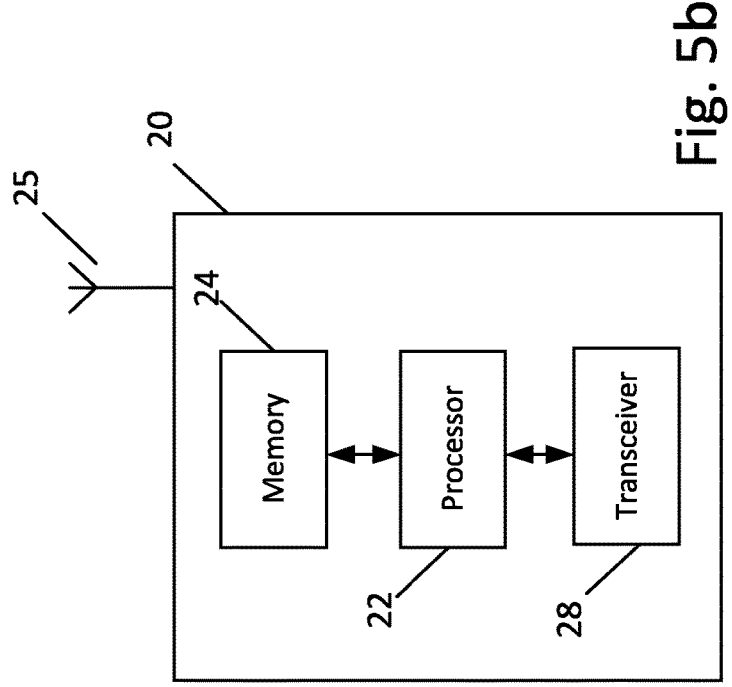
FIG. 5b illustrates an example block diagram of an apparatus, according to another embodiment.
Figure 5A:
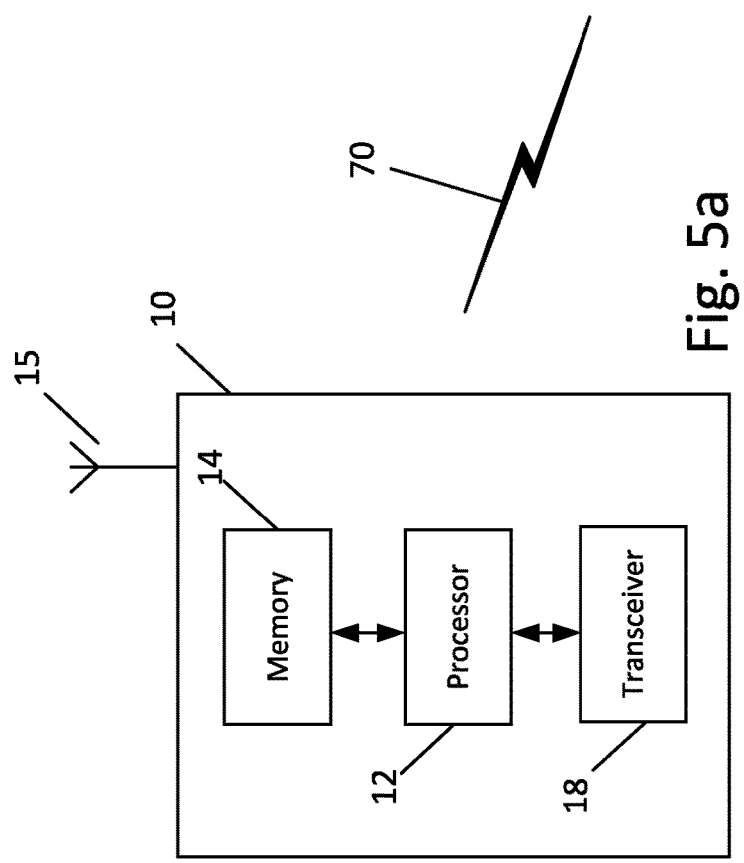
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3.

FIG. 5*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5*b*.

As illustrated in the example of FIG. 5*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-4. For instance, in one embodiment, apparatus 20 may be controlled by memory 24 and processor 22 to perform the method of FIG. 4.

In some embodiments, an apparatus (e.g., apparatus 10 and/or apparatus 20) may include means for performing a method or any of the variants discussed herein, e.g., a method described with reference to FIG. 4. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is improved power efficiency. As another example, certain embodiments may provide for fast determination of a REDCAP UE, thereby saving the UE time and/or power for reading and/or decoding information to find its extended MIB. Accordingly, the use of some example embodiments results in improved functioning of communications networks and their nodes and, therefore constitute an improvement at least to the technological field of managing extended MIB, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein can apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

3GPP 3rd generation project partner
AL Aggregation Level
BS Base Station
BWP Bandwidth Part
CCE Control Channel Element
CORESET Common Resource Set
DCI Downlink Control Information
DL Downlink
eMBB Enhanced Mobile Broadband
eNB Enhanced Node-B
FR Frequency Range
FR1 Frequency Range 1
FR2 Frequency Range 2
gNB Next Generation Node-B
MIB Master Information Block
MTC Machine Type Communication
NR New Radio
PRB Physical Resource Block
REDCAP Reduced Capability
RF Radio Frequency
RNTI Radio Network Temporary Identifier
RRC Radio Resource Control
SCS Subcarrier Spacing
SI-RNTI System Information Radio Network Temporary Identifier
SIB System Information Block
SIB1 System Information Block Type 1
SSB Synchronization Signal Block
UE User Equipment
UL Uplink
URLLC Ultra-Reliable Low-Latency Communication

We claim:

1. A method, comprising:
receiving, by a user equipment, a master information block on physical broadcast channel;
determining whether a master information block extension is indicated based on at least one of:
blind detection,
a spare bit in the master information block, or
a physical signal associated with a synchronization signal block; and
determining, based on the master information block extension being indicated, a physical broadcast channel extension time-frequency location within the physical broadcast channel based on:
a fixed time-frequency location, or
at least one of the synchronization signal block position or control resource set information.

2. The method according to claim 1, wherein symbols of the physical broadcast channel extension are multiplexed within a synchronization signal burst set.

3. The method according to claim 1, wherein symbols of the physical broadcast channel extension are multiplexed outside of a synchronization signal burst set.

4. The method according to claim 1, wherein the synchronization signal block position is a punctured synchronization signal burst set position.

5. The method according to claim 4, further comprising:
monitoring for the punctured synchronization signal burst set position for the physical broadcast channel extension time-frequency location.

6. The method according to claim 4, wherein an information element within a system information block 1 indicates the physical broadcast channel extension time-frequency location and a format of the physical broadcast channel.

7. The method according to claim 1, wherein determining the physical broadcast channel extension time-frequency location comprises:
determining the physical broadcast channel extension time-frequency location from a system information block 1 associated with the control resource set information and a search space location provided by the system information block 1 downlink control information.

8. The method according to claim 7, wherein a predefined mapping of the downlink control information defines the control resource set, or
wherein the search space location defines the physical broadcast channel extension time-frequency location and a format of the physical broadcast channel extension.

9. The method according to claim 7, wherein one or more spare bits within the system information block scheduling the downlink control information define the physical broadcast channel extension time-frequency location and a format of physical broadcast channel extension.

10. An apparatus, comprising:
at least one processor; and
at least one memory comprising computer program code,
the at least one memory and computer program code being configured, with the at least one processor, to cause the apparatus at least to perform receiving a master information block on physical broadcast channel;
determining whether a master information block extension is indicated based on at least one of:
blind detection,
a spare bit in the master information block, or
a physical signal associated with a synchronization signal block; and
determining, based on the master information block extension being indicated, a physical broadcast channel extension time-frequency location within the physical broadcast channel based on:
a fixed time-frequency location, or
at least one of the synchronization signal block position or control resource set information.

11. The apparatus according to claim 10, wherein symbols of the physical broadcast channel extension are multiplexed within a synchronization signal burst set.

12. The apparatus according to claim 10, wherein symbols of the physical broadcast channel extension are multiplexed outside of a synchronization signal burst set.

13. The apparatus according to claim 10, wherein the synchronization signal block position is a punctured synchronization signal burst set position.

14. The apparatus according to claim 13, wherein the at least one memory and computer program code further configured, with the at least one processor, to cause the apparatus to perform:
monitoring for the punctured synchronization signal burst set position for the physical broadcast channel extension time-frequency location.

15. The apparatus according to claim 13, wherein an information element within a system information block 1 indicates the physical broadcast channel extension time-frequency location and a format of the physical broadcast channel.

16. The apparatus according to claim 10, wherein determining the physical broadcast channel extension time-frequency location comprises:
determining the physical broadcast channel extension time-frequency location from a system information block 1 associated with the control resource set information and a search space location provided by the system information block 1 downlink control information.

17. The apparatus according to claim 16, wherein a predefined mapping of the downlink control information defines the control resource set, or
wherein the search space location defines the physical broadcast channel extension time-frequency location and a format of the physical broadcast channel extension.

18. The apparatus according to claim 16, wherein one or more spare bits within the system information block scheduling the downlink control information define the physical broadcast channel extension time-frequency location and a format of physical broadcast channel extension.

19. An apparatus, comprising:
circuitry configured to perform the method according to claim 1.

20. A non-transitory computer readable medium comprising program instructions stored thereon for causing an apparatus to perform the method according to claim 1.

* * * * *